(12) United States Patent
Bergeron

(10) Patent No.: US 9,542,853 B1
(45) Date of Patent: Jan. 10, 2017

(54) INSTRUCTION BASED ON COMPETENCY ASSESSMENT AND PREDICTION

(71) Applicant: Accella Learning, LLC, Louisville, KY (US)

(72) Inventor: Bryan P. Bergeron, Brookline, MA (US)

(73) Assignee: Accella Learning, LLC, Louisville, KY (US)

( * ) Notice: Subject to any disclaimer, the term of this patent is extended or adjusted under 35 U.S.C. 154(b) by 35 days.

(21) Appl. No.: 14/157,878

(22) Filed: Jan. 17, 2014

Related U.S. Application Data

(63) Continuation-in-part of application No. 13/714,474, filed on Dec. 14, 2012, now Pat. No. 8,684,747, which is a continuation of application No. 12/328,018, filed on Dec. 4, 2008, now Pat. No. 8,356,997.

(60) Provisional application No. 61/012,615, filed on Dec. 10, 2007.

(51) Int. Cl.
G09B 7/00 (2006.01)
G09B 5/02 (2006.01)
G09B 23/30 (2006.01)
G09B 23/28 (2006.01)

(52) U.S. Cl.
CPC .............. *G09B 5/02* (2013.01); *G09B 23/28* (2013.01); *G09B 23/30* (2013.01)

(58) Field of Classification Search
CPC ............ G09B 5/00; G09B 7/00; G09B 23/28; G09B 23/30
USPC ........................................ 434/322, 323, 365
See application file for complete search history.

(56) References Cited

U.S. PATENT DOCUMENTS

| | | |
|---|---|---|
| 5,870,731 A | 2/1999 | Trif et al. |
| 5,934,909 A | 8/1999 | Ho et al. |
| 6,063,028 A | 5/2000 | Luciano |
| 6,118,973 A | 9/2000 | Ho et al. |
| 6,315,572 B1 | 11/2001 | Owens et al. |
| 6,606,480 B1 | 8/2003 | L'Allier et al. |
| 6,807,535 B2 | 10/2004 | Goodkovsky |
| 6,832,069 B2 | 12/2004 | Stout et al. |
| 6,839,724 B2 | 1/2005 | Manchanda et al. |
| 7,052,277 B2 | 5/2006 | Kellman |

(Continued)

FOREIGN PATENT DOCUMENTS

| | | |
|---|---|---|
| JP | 5281899 | 10/1993 |
| WO | WO 2006/117498 | 11/2006 |

OTHER PUBLICATIONS

Caballe, S, et al., "Using a grid platform for enabling real time user modeling in on-line campus," IEEE Comput. Sco., 2007 5th International Conference on Complex Intelligent and Software Intensive Systems, Los Alamitos, CA, (Apr. 10-12, 2007). Abstract only.

(Continued)

*Primary Examiner* — Peter Egloff
(74) *Attorney, Agent, or Firm* — Frost Brown Todd LLC

(57) ABSTRACT

An intelligent tutoring system can be implemented using filters, predictive modeling, and a knowledge warehouse, which allows content to be dynamically selected for individualized presentation to a learner. Such an intelligent tutoring system can be implemented using a variety of techniques, including polynomial vector equations in modeling, extensible markup language storage formats for presentation data, and a knowledge warehouse with information stored in data cubes.

11 Claims, 14 Drawing Sheets

(56) References Cited

U.S. PATENT DOCUMENTS

| | | |
|---|---|---|
| 7,082,418 B2 | 7/2006 | Levy et al. |
| 7,095,979 B2 | 8/2006 | Stout |
| 7,181,158 B2 | 2/2007 | Heller et al. |
| 7,210,938 B2 | 5/2007 | Packard et |
| 7,286,793 B1 | 10/2007 | Miele |
| 7,493,077 B2 | 2/2009 | Coleman et al. |
| 7,774,301 B2 | 8/2010 | Johnson et al. |
| 7,822,768 B2 | 10/2010 | Maymir-Ducharme et al. |
| 8,356,997 B1 | 1/2013 | Bergeron |
| 2003/0129574 A1* | 7/2003 | Ferriol ............... 434/362 |
| 2003/0236796 A1 | 12/2003 | Easter et al. |
| 2004/0064298 A1* | 4/2004 | Levine ............... 703/11 |
| 2005/0181340 A1* | 8/2005 | Haluck ............... 434/258 |
| 2005/0257139 A1 | 11/2005 | Burst et al. |
| 2006/0127871 A1* | 6/2006 | Grayson ............... 434/350 |
| 2006/0166174 A1* | 7/2006 | Rowe et al. ............... 434/236 |
| 2006/0234200 A1 | 10/2006 | Rochedy |
| 2006/0240394 A1 | 10/2006 | Smith et al. |
| 2006/0246411 A1 | 11/2006 | Yang |
| 2007/0172808 A1 | 7/2007 | Capone |
| 2007/0190505 A1 | 8/2007 | Hugonnard-Bruyere et al. |
| 2008/0162274 A1* | 7/2008 | Newman ............... 705/11 |

OTHER PUBLICATIONS

Intelligent Tutoring Technology, Accella Learning LLC, Excerpts of Funding Proposal No. A074-003-0102, pp. 1-28, (Apr. 15, 2006).

\* cited by examiner

KW Example
MEDICAL MANAGEMENT OF RADIATION INCIDENTS

COMPETENCIES

Knowledge:

Vocabulary:
        Psychology:
            A1. Risk    501
            A2. Risk perception    502

Physics
            Radiation:
                B1. Radiological accident
                B2. Radiation
                B3. Radioactivity
                B4. Ionization

Radiological Preparedness:
                C1. Exposure
                C2. Contamination
                C3. Internal contamination
                C4. Radionuclide incorporation
                C5. Protection
                C6. Detection and Monitoring
                C7. Contamination Control
                C8. Instrumentation
        Biology:
            Radiation:
                D1. Biological effects

---

Discussion:
        Psychology:
            F1. Risk
            F2. Risk perception

Physics:
            Radiation:
                G1. Radiological accident

FIG. 5a

G2. Radiation
G3. Radioactivity
G4. Ionization

Radiological Preparedness:
    H1. Exposure
    H2. Contamination
    H3. Internal contamination
    H4. Radionuclide incorporation
    H5. Protection
    H6. Detection and Monitoring
    H7. Contamination Control
    H8. Instrumentation
    H9. Radiation consequences Biology:
  Radiation:
    Biological Effects:
      I1. Ionizing Radiation
      I2. Psychology

Treatment & Management:
    J1. Scene
    J2. Hospital
    J3. Decontamination
    J4. Determine Isotope
    J5. Diagnosis
    J6. Treatment Regulations:
  Radiation:
    Exposure:
    K1. Goal      503
    K2. Limits Planning:
  Radiation event:
    L1. Responses
    L2. Injuries
    L3. Facilities
    L4. Staffing
    L5. Supplies

---

Skill:

FIG. 5b

Radiation:
    Radiological Preparedness:
        Select detection instruments in simulated incident:
            M1.

Use detection instruments in simulated incident:
            N1.

Select appropriate treatment of radiation victim:
            O1.

Prepare treatment of radiation victim:
            P1.

Treat radiation victim:
            Q1.

Select appropriate decontamination of radiation victim:
            R1.

Prepare for decontamination of radiation vicitm:
            S1.                       504

Decontaminate radiation victim:
            T1.

Perform contamination control techniques during emergency care of radiological victims:
            U1.

FIG. 5c

INSTRUCTION BASED ON COMPETENCY ASSESSMENT AND PREDICTION

CROSS REFERENCE TO RELATED APPLICATIONS

This claims priority from, and is a continuation in part of U.S. non-provisional patent application Ser. No. 13/714,474, filed on Dec. 14, 2012 having the same inventor as listed above. That application was a continuation of, and claims priority from, U.S. non-provisional patent application Ser. No. 12/328,018, filed on Dec. 4, 2008 and having the same inventor as listed above, which claimed priority from, and was a non-provisional of U.S. provisional application No. 61/012,615, filed on Dec. 10, 2007, also having the same inventor as listed above. The disclosures of each of those applications are hereby incorporated by reference in their entireties.

FIELD

Certain aspects of the teachings of this disclosure can be implemented in the field of software aided training.

BACKGROUND

Acquiring and retaining information are highly individualized processes, with any given individual learning and forgetting at rates based on factors which may not exist, or may not exist with the same intensity, for anyone else. For example, the speed of information acquisition may be influenced by factors such as how well the presentation of that information matches an individual's learning style and/or the individual's aptitude for a particular subject. Similarly, while the degradation of an individual's competency with time is a common problem with all levels and ages, the rate and level of that degradation for a particular individual will be influenced by factors such as the extent to which a particular competency is utilized in the individual's day to day activities. While this individual variability can to some extent be accounted for through instruction which incorporates intelligent tutoring systems such as described in the incorporated priority documents, in many cases where competency decay is of particular concerns, such as in professions which have continuing education and/or certification requirements, education and testing requirements will be defined on a periodic basis which fails to account for individual variability. Accordingly, there exists a need in the art for improved technology which can account for individual variability in acquiring and retaining information.

SUMMARY

This document comprises a disclosure of various techniques and tools which can be used for training individuals and storing information related to those individuals' educational achievement. As will be apparent to one of ordinary skill in the art in light of this disclosure, the teachings of this disclosure can be utilized in a variety of different implementations. For example, the teachings of this disclosure can be used to implement a system in which data gathered on a user's interaction with a set of educational content is provided as input to a predictive competency model and used in real time to personalize the presentation of content to the user. Similarly, it is also possible that data regarding the degradation of a user's competencies over time could be used to predict the degradation of those competencies and schedule remedial training to counteract such degradation. Other implementations will be immediately apparent to, and could be implemented without undue experimentation by, those of ordinary skill in the art in light of this disclosure. Accordingly, this summary should be understood as being illustrative only, and should not be treated as implying limitations on the scope of the claims included in this document or on the scope of claims included in any related document.

DESCRIPTION OF THE DRAWINGS

The drawings and detailed description which follow are intended to be illustrative and are not intended to imply limitations on the scope of potential implementations of the disclosure set forth herein.

FIGS. 5a-5c show a structure which could be used in the organization of data in a competency database.

DETAILED DESCRIPTION

The following description should not be understood as being limiting on the scope of any claims included in this document, or in any document which is related to this document. Other potential applications and embodiments of the teachings of this disclosure beyond those explicitly set forth herein are contemplated by the inventors, and could be implemented by those of ordinary skill in the art without undue experimentation. Accordingly, the drawings and descriptions should be regarded as illustrative in nature and not limiting.

Figure 1:
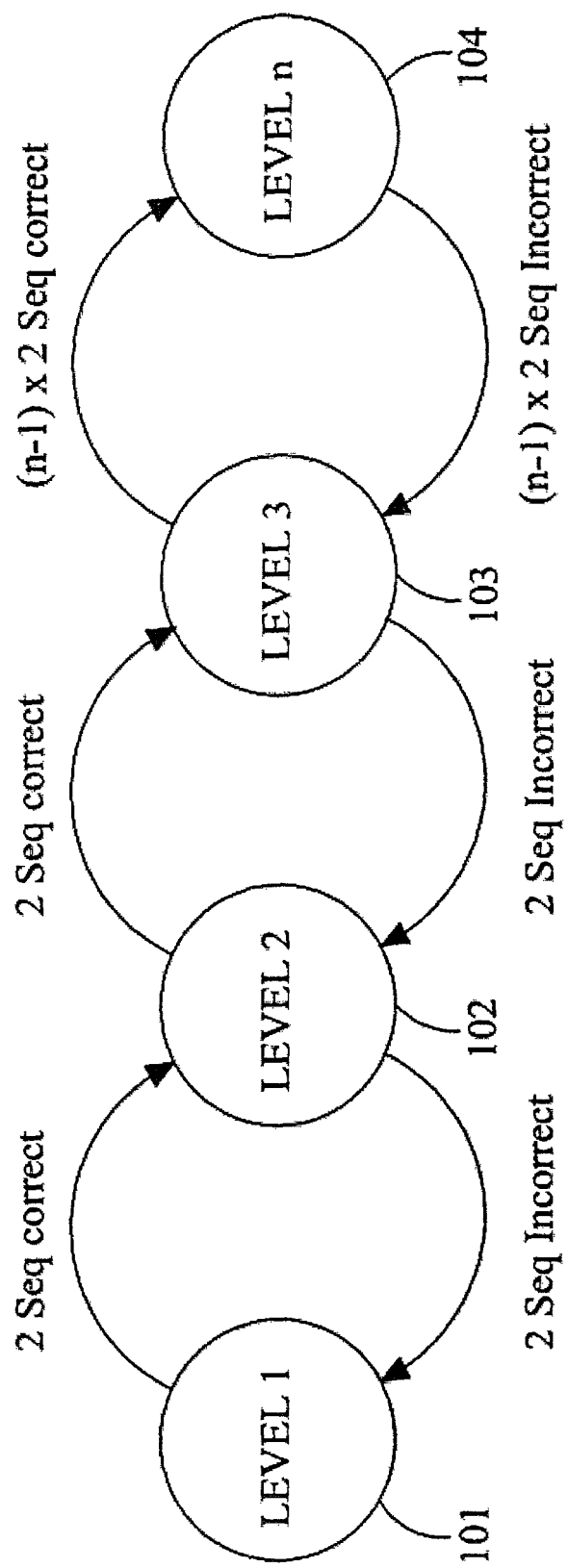
FIG. 1 depicts a state diagram.

As an illustration of one possible implementation of certain teachings of this disclosure, consider the diagram of FIG. 1. That figure depicts a state diagram in which a plurality of levels [101][102][103][104] represent different categories of content (e.g., test questions, instructional segments, etc.) which could be presented to a learner using an intelligent tutoring system. As shown in FIG. 1, it is possible for a learner to move between levels in both ascending (e.g., level 1 to level 2) and descending (level 2 to level 1) order, depending on inputs provided by the learner. In this way, content can be dynamically tailored for particular individuals being trained. For example, material presented might be organized into a series of articles and accompanying comprehension questions. A tutoring session could begin with presentation of the most basic articles to the user, then, as the user indicates comprehension of the material in those articles (e.g., by correctly answering the accompanying questions) material of increasing complexity could be presented to the user. Similarly, if a user indicates that he or she is having difficulty with a particular subject (e.g., by incorrectly answering questions related to that subject), the user could be presented with material having lesser complexity. In this manner, a system can be implemented that ensures that the material presented to a user is appropriately matched to that user's knowledge and skill level, and which could also modify the amount and content of material which was presented to the learner (e.g., a learner with more advanced knowledge might be presented with less material than a learner who requires more basic instruction to attain mastery of a concept).

Of course, it should be understood that the description above is not intended to be an exhaustive description of potential uses for a system which allows user state transitions such as shown in FIG. 1. For example, in some cases, instead of (or in addition to) allowing a learner to transition between levels which vary in complexity, it might be possible to allow users to transition between levels that vary in other manners, such as in terms of presentation modality, or learning style. Thus, if a learner's input indicates that he or she is a kinesthetic learner, rather than a visual learner, the content presented to that learner might be varied so as to be more appropriate to that individual's learning style. Similarly, instead of (or in addition to) receiving user inputs in the form of answers to questions, a system which allows user state transitions such as described in the context of FIG. 1 could receive input in the form of measurements of how long a user spends on a particular section of content or whether a user interacts with any particular aspect of a section of content. In some instances, specialized hardware might be utilized to facilitate this measurement. For example, a camera might track eye movement and/or expression to determine an individual's focus and comprehension level vis-à-vis various parts of presented content.

As yet another variation on the concept of user state transitions, it is also possible that a variety of techniques for utilizing user inputs could be implemented in different situations. For example, while FIG. 1 depicts transitions based on actual inputs provided by the user, other approaches to transitions—such as transitions based on predictive modeling—are also possible. As an example of the use of predictive modeling for state transitions, consider the (extremely simplified) scenario in which a learner's expertise is modeled with the formula $$c = k + v_w t$$

where c is the learner's expertise, $v_w$ is the weighted velocity of learner expertise in score change per hour, k is the learner's initial level of expertise, and t is the time in hours. In such a case, the learner's expertise (hence the appropriate material to present to the learner) can be predicted as a linear function increasing with time. By using this model, the appropriate information can be presented to the learner despite the possibility of inaccurate or missing user input data. Of course, the simplified formula set forth above is not intended to imply that modeling for state transitions is limited to linear expertise increase situations. As an alternative, nonlinear formulae, such as $$c=0.1t^3+1.0143t^2+0.6571t+41.0114 \text{ (with the more general form of } c=p_1t^n+p_2t^{n-1}+p_3t^{n-2}+\ldots+p_{n-1}t+p_n)$$

or any other type of formula (e.g., a polynomial vector student model) could also be used.

Figure 2:
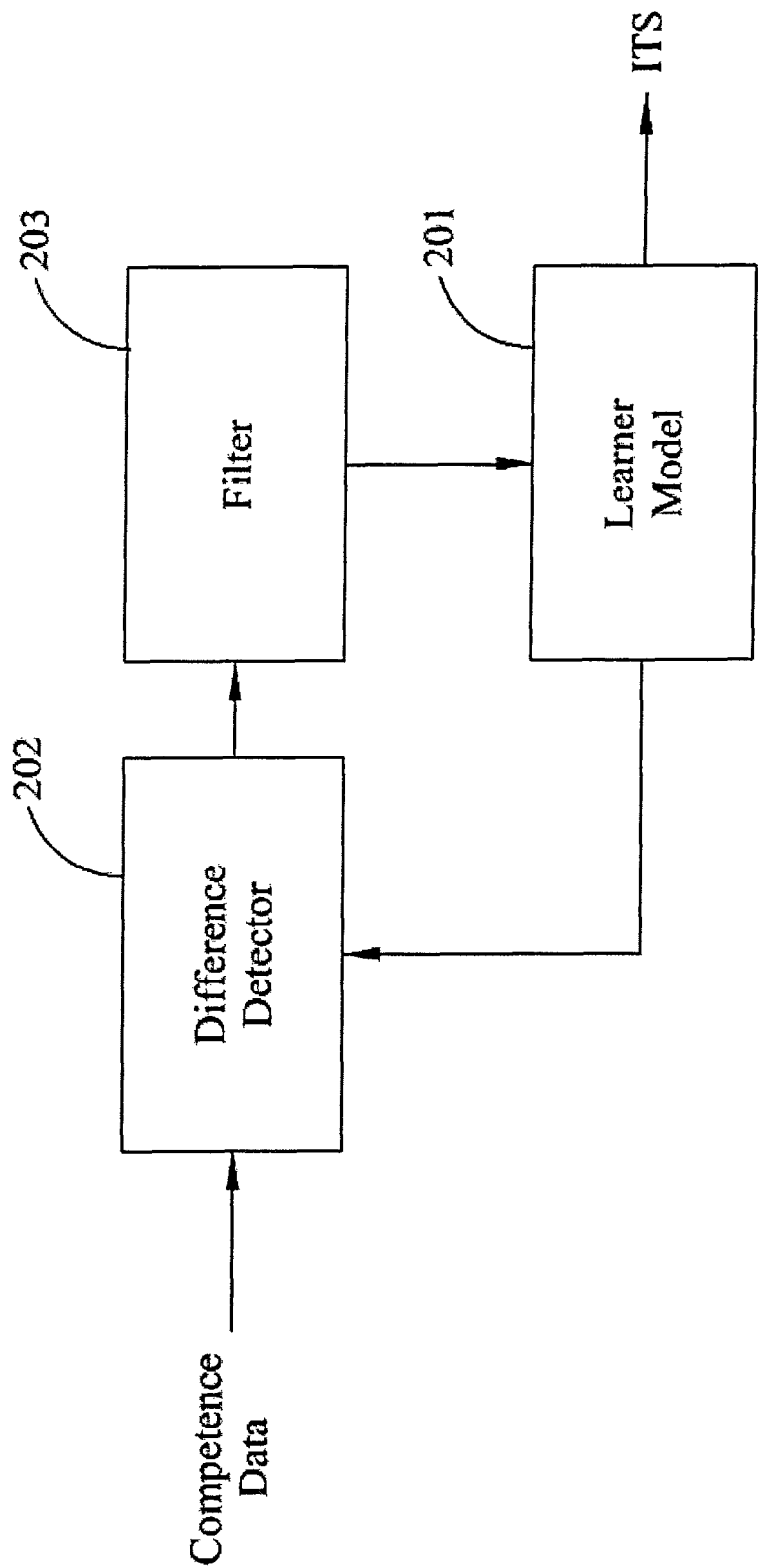
FIG. 2 depicts a closed-loop system which provides feedback to a learner model.

As yet a further refinement, in some cases combinations of transitions based on learner input and predictive modeling could also be used. For example, it is possible that transitions between states could be controlled by a model, and that user input is also gathered, and used as feedback for improvements and modifications to that model. As a demonstration of one potential approach to this technique, consider the diagram of FIG. 2. In FIG. 2, the output of a learner model [201] is sent to other components in an intelligent tutoring system which can be used to control transition between states and information presented to the learner. The output of the learner model [201] is also sent to a difference detector [202] which can compare the output of the learner model [201] with inputs from the learner (e.g., competence data). The output of the difference detector [202] can then be passed to a filter [203] which can be implemented as a software module configured to determine how the difference between predicted and real results should be used to modify the underlying learner model [201]. Accordingly, in some implementations a learner model [201] could be dynamically refined based on user input data.

Various techniques can be used for refining the learner model [201] in closed loop systems such as shown in FIG. 2. For example, it is possible that techniques such as minimizing either the weighted or unweighted measure of the distance between predicted and measured values could be implemented using the following formula:

$$S = \sum_{i=1}^{n} w_i (y_i - f(x_i))^2$$

Where S is the weighted sum of the squares of the distances between the predicted and measured values, $w_i$ is the weight for data point i, $y_i$ is the measured value for data point i, and $f(x_i)$ is the predicted value for data point i. In such a case, to obtain an unweighted sum, the value $w_i$ would be 1 for each measurement. Further refinements, such as the use of various types of Kalman Filter (including Classic Kalman Filters, Complementary Kalman Filters, Extended Kalman Filters, and Unscented Kalman Filters) can also be implemented. Additionally, it is also possible that implementations which use both modeling and measurements could be created using techniques other than those set forth above (e.g., neural or Bayesian networks), which may or may not include separate filtering as a part of feedback. Accordingly, the discussion above of various types of modeling, state transition, filtering and feedback implementations should be understood as being illustrative only, and not limiting on any claims included in this application or any application claiming priority from this application.

Of course, it should be understood that, in addition to variations between transitioning techniques, different implementations of the teachings of this disclosure might also include different approaches to integrating the state-transition concept. For example, in some cases, an implementation might include a single scale (e.g., complexity of material, or progression through cumulative material) to be presented to a user. However, in other situations, there might be multiple different areas of knowledge or aspects of content contained in a set of material to be presented to a learner, and each of those areas of knowledge might have different transition characteristics, or be represented by a different state machine in the system which controls presentation. As a concrete example of this, consider a situation where a learner is to be instructed in the medical management of radiation incidents. As shown in FIGS. 5a-5c, there might be a variety of areas of learning (competencies, such as vocabulary related to the psychology of risk [501] and risk perception [502], regulations regarding radiation exposure limits [503], steps for decontaminating a victim [504], etc) which could be considered relevant to the overall subject matter of the material presented to the learner. In a situation where individual competencies are uniquely modeled, the learner might be presented with information in one competency (e.g., the physics of radioactivity) which are appropriate for a high level of skill, while being presented with more basic information in one or more other competencies (e.g., the biological effects of radiation). In this way, fine grained optimization of information presented to a learner can be achieved, and the overall effectiveness and efficiency of the learning process can be increased.

Figure 6:
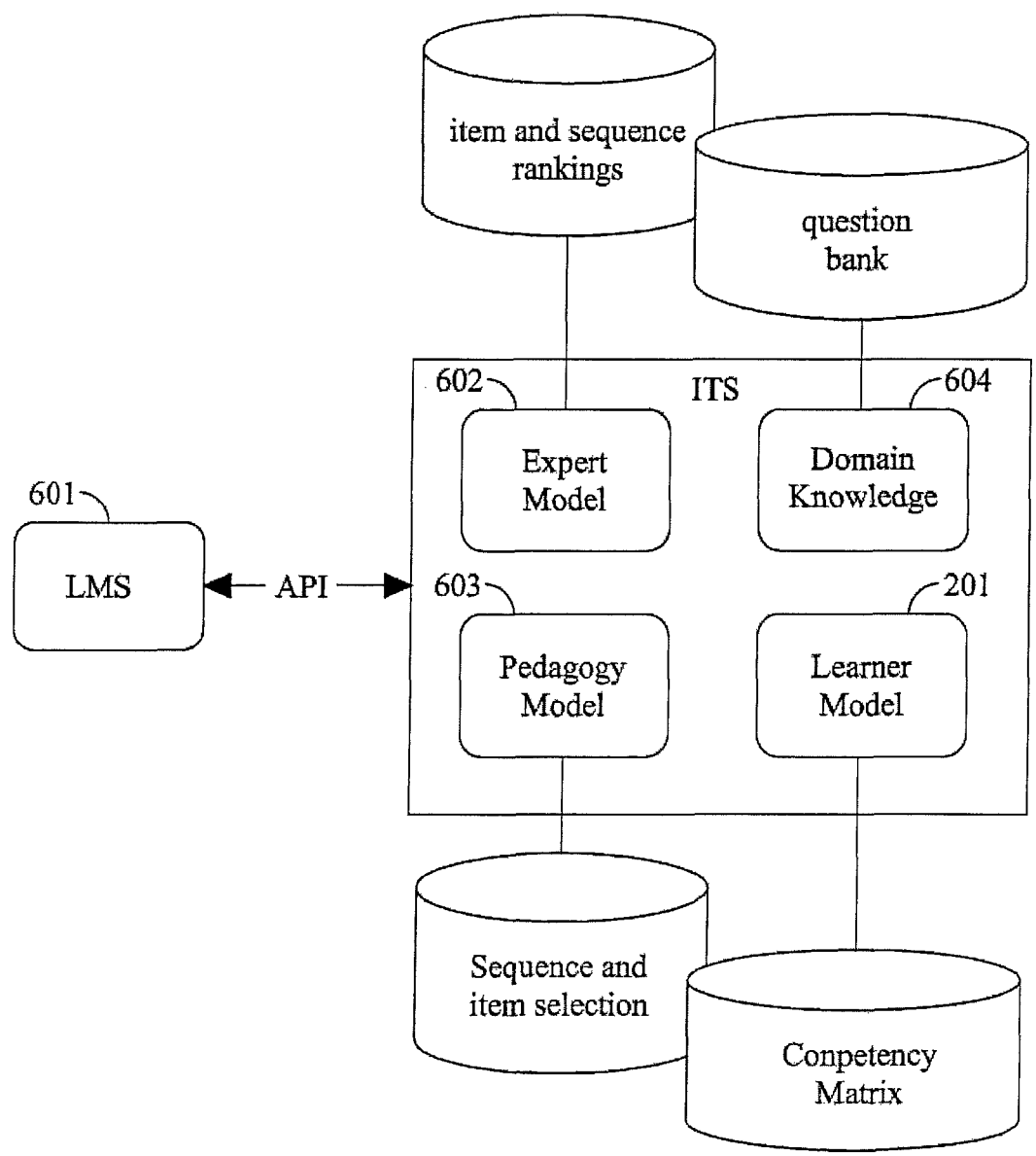
FIG. 6 depicts a set of components which could be used to control the operation of a learning management system (LMS).

As a concrete example of a system which could allow for the dynamic selection of material presented to a learner, consider the diagram of FIG. 6. FIG. 6 depicts a system which could be used to control the operation of a learning management system (LMS) [601]. In the system of FIG. 6, the expert model [602] portion of the intelligent tutoring system (ITS) is a data component which is instantiated with item and sequence rankings based on expert behavior. The pedagogy model [603] is instantiated with sequence and item selections, i.e., groupings and sequences appropriate for various skill levels in a particular competency. The domain knowledge [604] comprises information related to the various competencies that might be presented to the learner, such as an overall question bank, multimedia content, and instructional articles. Those components would then interact with the learner model [201], to control the information presented to the learner. The expert model [602] would provide potential groupings and sequences for the information that could be presented to the learner. The pedagogy model [603] would indicate which sequences and selections should be made based on the specific skill level of the learner, that skill level being derived from the learner model [201]. Then, the actual information would be provided from the domain knowledge [604]. The specific content elements which make up the domain knowledge [604] could be expressed in an extensible markup language (XML)-based format, and use metadata tags to indicate the attributes of any of the specific elements (e.g., competency area, difficulty level of questions, learning system of material, or other attributes). These tags might be used, either alone or in combination with information provided from the pedagogy model [603], to determine what information to provide to a learner in light of the characteristics of the learner (e.g., skill level at various competencies) as reflected in the learner model [201].

Figure 3:
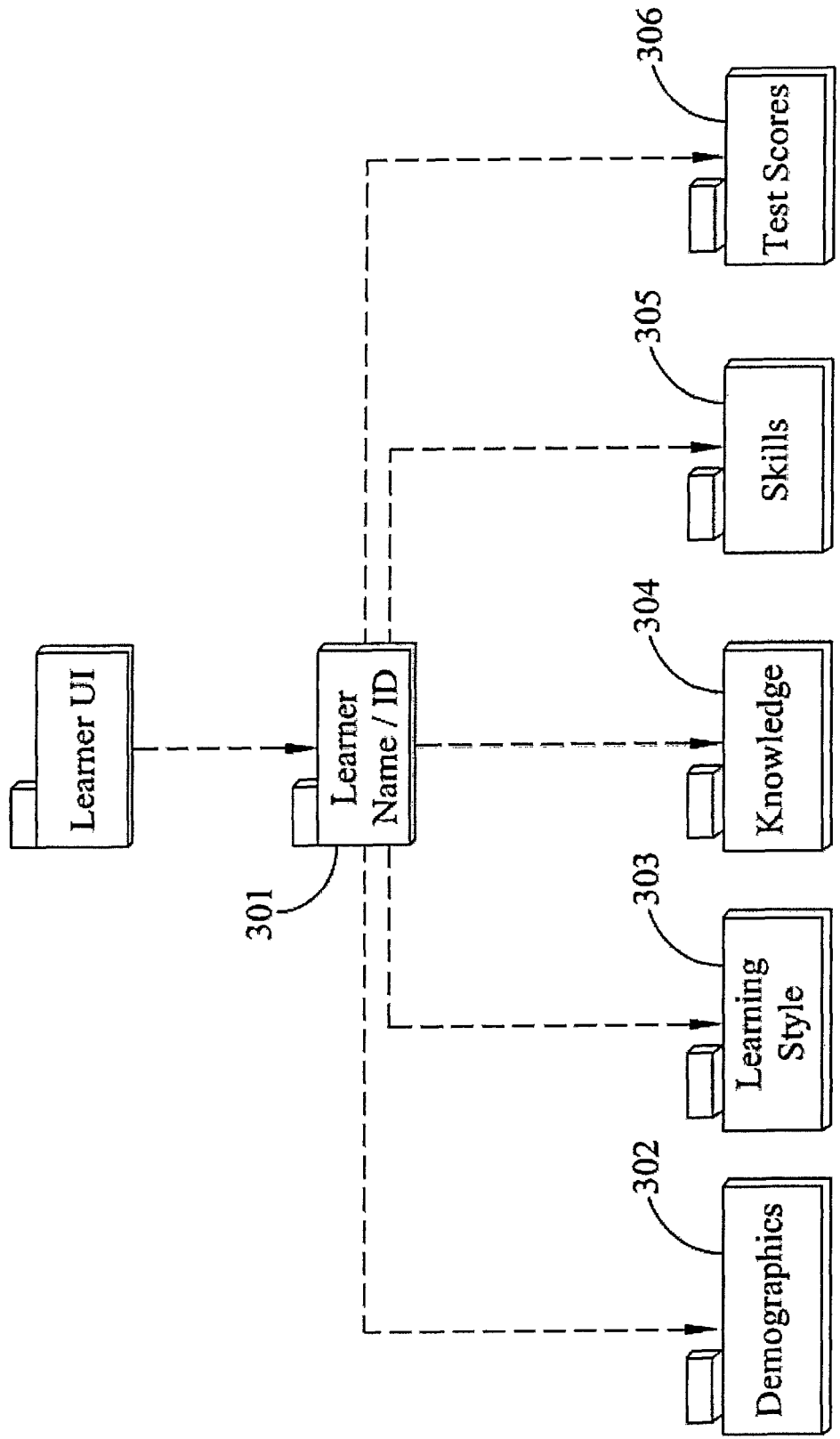
FIG. 3 depicts a high level view of a potential set of associations between different types of information relevant to a learner.
Figure 4:
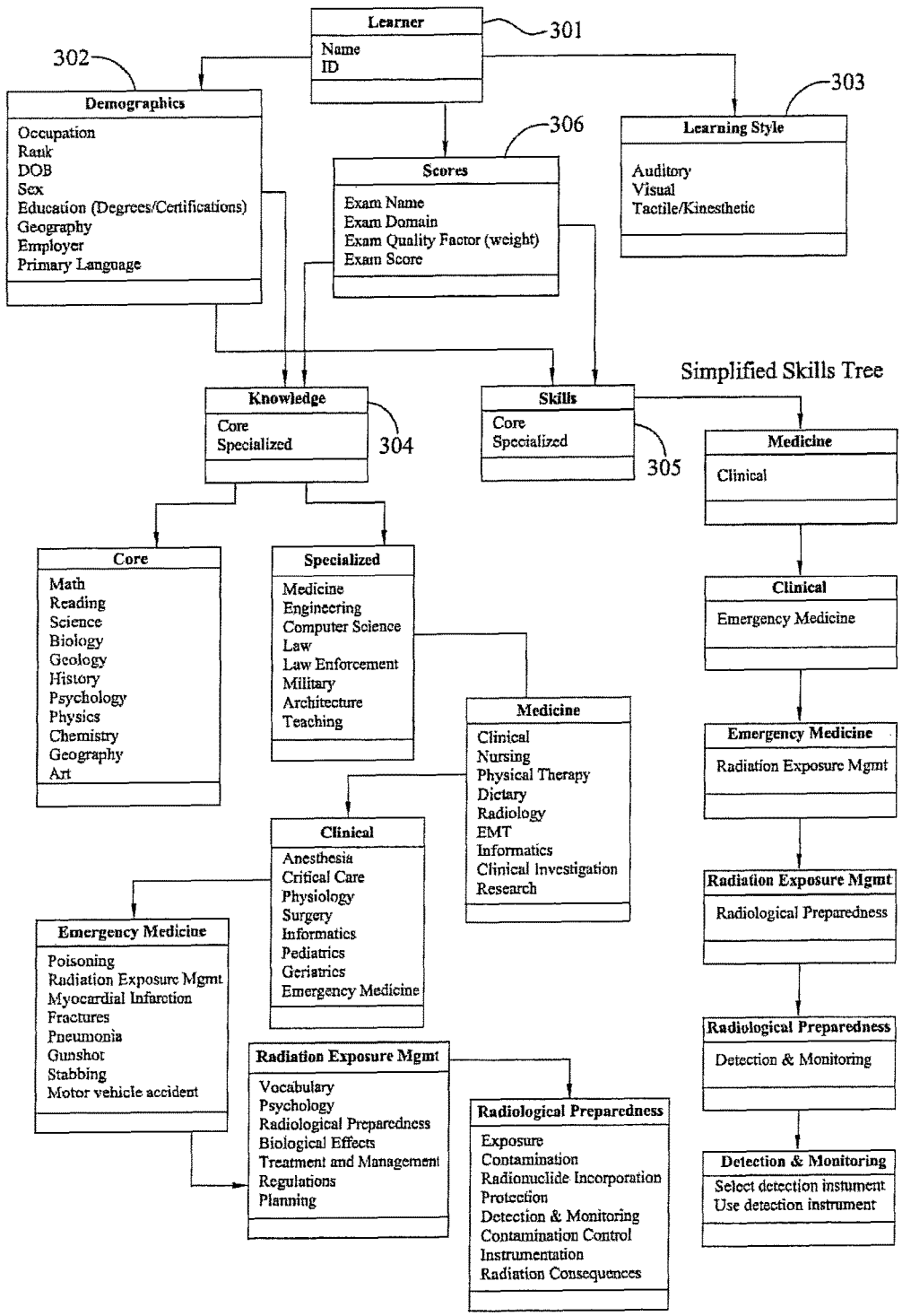
FIG. 4. shows an example of potential associations between types of data within a competency database.
Figure 7:
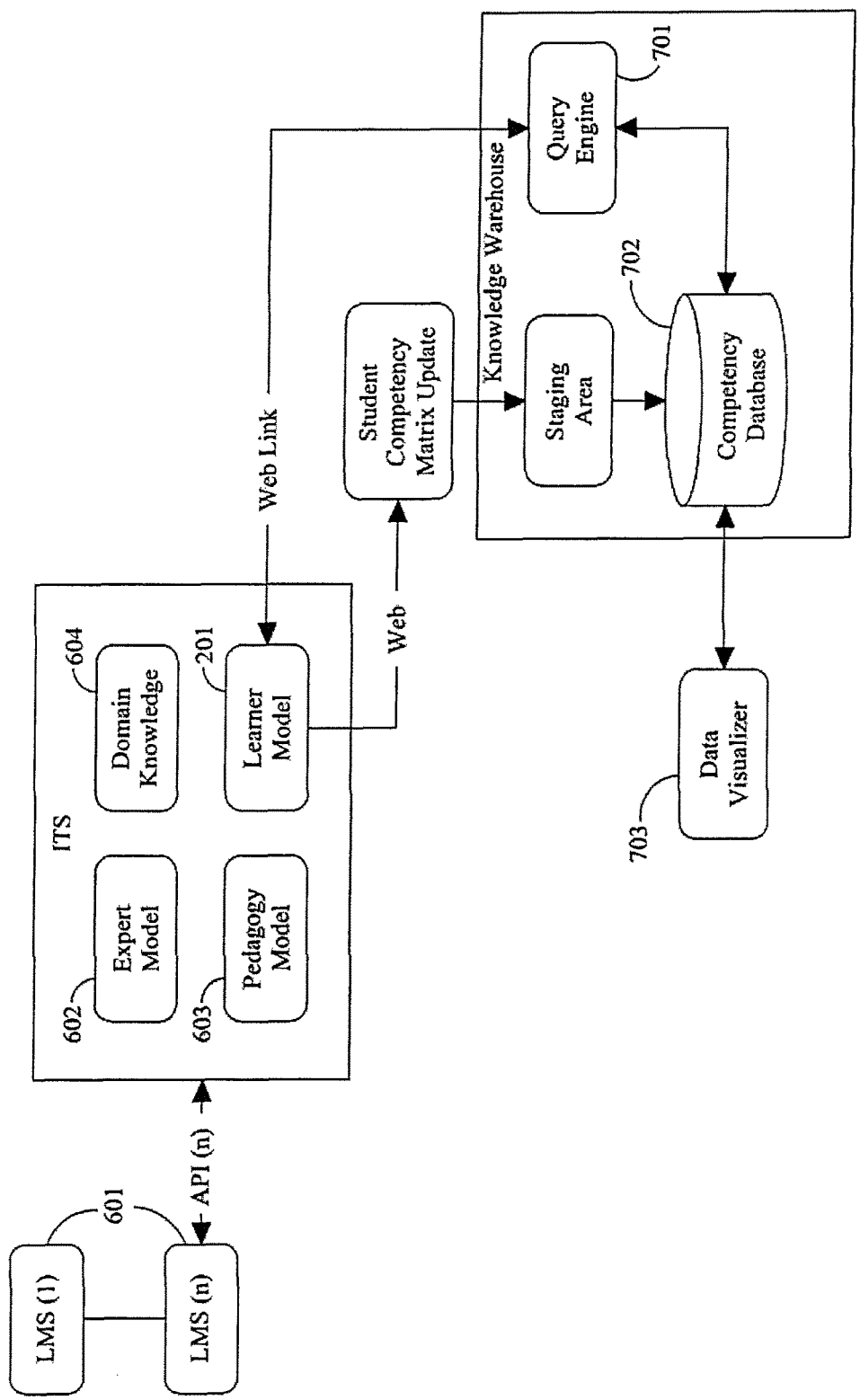
FIG. 7 depicts how a knowledge warehouse can be implemented as an extension to an intelligent tutoring system.

Turning now to FIG. 7, that figure depicts how a knowledge warehouse can be implemented as an extension to an intelligent tutoring system such as depicted in FIG. 6. As shown in FIG. 7, an intelligent tutoring system can utilize a query engine [701] to obtain information for a learner model [201]. The query engine [701] can be implemented as a software process configured to retrieve data from a competency database [702] for a student. The information in the competency database [702] can be organized in a variety of manners. For example, the information in the competency database [702] can be represented in the form of on-line analytical processing (OLAP) cubes indexed by competency metadata. Specific illustrations of potential organizations for information in the competency database [702] are given in FIGS. 3-4 and 5a-c. FIG. 3 shows a high level view of a potential set of associations between different types of information relevant to a learner. For example, as shown in FIG. 3 a record for a learner could be uniquely determined by a learner name or ID [301]. Then, the record for that learner could include information regarding the learner's demographics [302], learning style [303], knowledge [304], skills [305], and test scores [306]. FIG. 4 shows a more detailed example of potential associations between types of data (e.g., those depicted in FIG. 3) within a competency database [702]. FIGS. 5a-5c show an alternative structure which could be used in the organization of data in a competency database [702]. Referring specifically to FIGS. 4 and 5a-c, it should be understood that, though those figures depict organization in knowledge domains related to radiation incidents, it is not required that a competency database [702] be devoted to information regarding radiation incidents, or that it be devoted to a particular knowledge domain at all. For example, as shown in FIG. 4, radiation exposure management could be only one entry in a general subject such as emergency medicine, which itself could be a nested entry in the general knowledge structure. While it is possible that some competency databases [702] might be organized for specific domains, in other implementations, a competency database [702] might be structured according to a general purpose organizational scheme. In such a case, different curricula might use techniques such as assigning different weights to different areas of the competency database [702] when assigning values to particular types of knowledge, thereby allowing the same database to be used as a general purpose tool in a variety of domains, rather than simply in domains related to radiation incidents, as shown in FIGS. 5a-5c.

Figure 8:
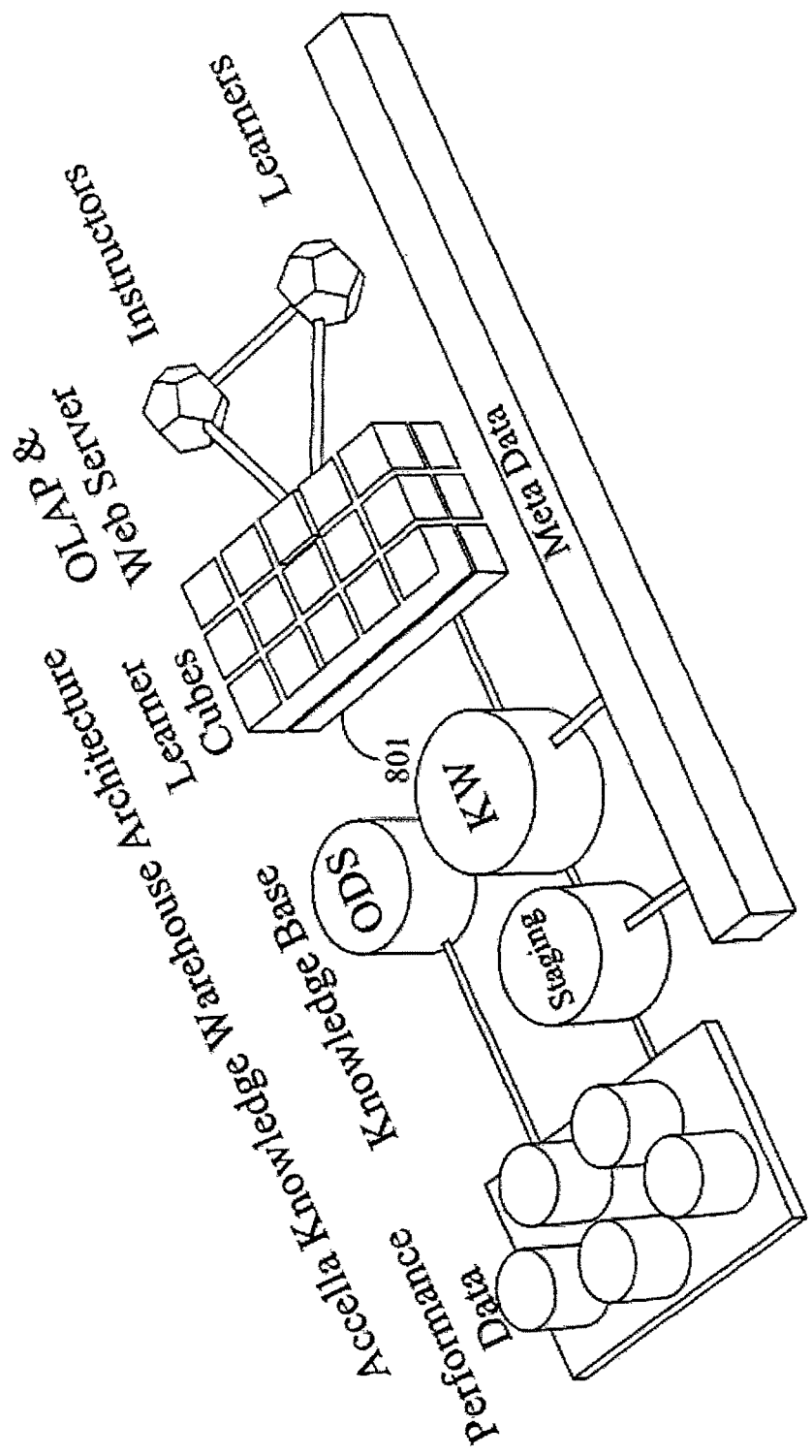
FIG. 8 depicts a view of potential components of a knowledge warehouse.

Returning to the discussion of FIG. 7, another aspect of certain knowledge databases which could be implemented by those of ordinary skill in the art in light of this disclosure is the ability to update information in the competency database [702] based on input received from a learner. Such updates might take place on a variety of schedules, for example, inputs received from a user might be propagated back to the competency database [702] in real time, might only be propagated back based on the occurrence of some event (e.g., completion of a module, session, or curriculum) or using some combined approach. The actual back propagation might be performed, for example, by using metadata for the competency database [702] to define processing operations which would be performed on raw data before that data could be incorporated. Examples of such processing operations include cleaning raw data (e.g., applying rules for allowable values, such as that age is a numerical value between 1 and 99, that a test score must be between 0 and 100%, etc) as well as transforming raw data by, for example, performing sorting, lookup, and calculations required to ensure quality, accuracy and compatibility of data accumulated from a variety of sources (e.g., transforming date of birth from MM/DD/YYYY format to DD/MM/YYYY format, converting a test result from a percentage to a z-score, etc). Also, as shown in FIG. 7, some implementations might include a visualizer [703], which could be used to provide a graphic interface to information maintained in the knowledge warehouse—for example, by providing an aggregate view of the contents of the competency database [702]. Of course, it should be understood that the representation provided in FIG. 7, along with the discussion above, is not intended to imply limitations on the potential implementations of this disclosure, or any claims included in this application or any applications which claim priority from this application. As an example of a further variation, consider the architecture shown in FIG. 8, which provides an alternative view of a knowledge warehouse, including OLAP cubes [801] storing information about particular students. Accordingly, the discussion of the knowledge warehouse set forth herein should be understood to be illustrative only, and not limiting.

Using approaches such as those set forth above, it is possible to provide a general purpose intelligent tutoring system add-on to a learning management system. As shown in FIG. 7, various components can be configured in a pluggable manner (e.g., a knowledge warehouse can interact with an intelligent tutoring system over a network, an intelligent tutoring system can interact with an appropriate learning management system through an application programming interface). This could allow for creation of a server-based intelligent tutoring system which allows dynamic sequencing of content for a learning management system without requiring that a model for a learner be constructed de novo for a particular LMS, or that data for that learner be collected independently for each individual curriculum. Rather, the learner model could be read into the intelligent tutoring system in real time from a knowledge warehouse, while data could be stored in a general purpose data organization in the content database, allowing a variety of different LMSes and/or curricula to be deployed without requiring retooling or data recreation. Of course, it is also possible that a toolset could be implemented to allow integration between a learning management system and the various components which might be used in conjunction with such a system. For example, standards could be created for metadata described previously to facilitate integration between different aspects of the system. Similarly, an implementation of certain aspects of the technology described herein might include published standard learner model vectors, and access mechanisms for various components of the system.

Figure 9:
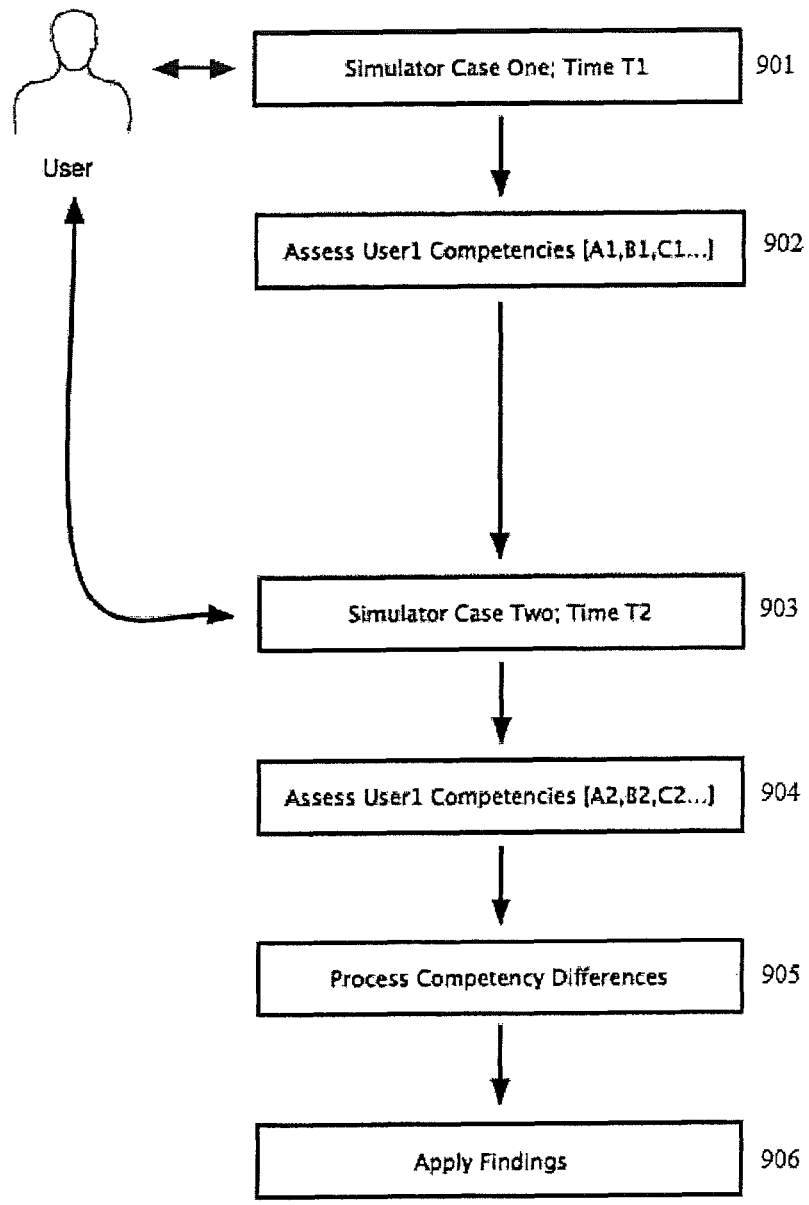
FIG. 9 depicts an exemplary high-level depiction of how aspects of the disclosed technology can be used to assess and predict competency degradation over time for a user in a simulator enabled system.

Turning now to FIG. 9, that figure provides an exemplary high-level depiction of how aspects of the disclosed technology can be used to assess and predict competency degradation over time for a user in a simulator enabled system. In particular, FIG. 9 depicts a process which begins with a user interacting with a simulator, such as by working through [901] a clinical case on a mannequin-based simulator with cardiovascular signs, at a first time referred to in the diagram of FIG. 9 as Ti. In this process, as part of, or after, the interaction with the simulator, the user's level in one or more competencies (e.g., abilities, such as the ability to detect or identify a specific finding) is assessed [902]. As will be apparent in light of this disclosure, this assessment is preferably time specific, a fact reflected in the diagram of FIG. 9 through the use of competency labels which include the time that an assessment of the user's level in the underlying competency (i.e., in FIG. 9, "A1" refers to competency A at time T=1, "B1" refers to competency B at time T=1, etc). As a concrete illustration, assuming that the user's interaction at time T=1 is to work through a clinical case simulating an elderly male with a history of smoking and cardiovascular findings, then competency A at time T=1 could be ability to detect and identify a systolic murmur through auscultation with a stethoscope, competency B at time T=1 could be ability to locate and assess pedal pulses with the fingertips, and competency C at time T=1 could be the ability to located and asses the PMI (point of maximum impulse) on the mannequin's chest wall with the fingertips.

Continuing with the discussion of FIG. 9, after a passage of time sufficient in duration (e.g., a period of several days, or longer, such as several months or years) such that a second assessment would assess the long-term memory—as opposed to short term or working memory—of the user, the user performs a second interaction with the simulator, this time (time T=2) working through [903] a different scenario which implicates at least one of the competencies which was previously assessed [902]. For example, if the user's interaction at time T=1 had been to work through a clinical case simulating an elderly male with a history of smoking and cardiovascular findings, the user's interaction at time T=2 could comprise working through a clinical case simulating a young female athlete with exercise induced cardiovascular findings. Either in the course of, or after, this second interaction [903] the user's level in the competencies implicated in that interaction will be assessed [904]. Of course, it should be understood that, while in a process such as shown in FIG. 9 there will preferably be at least one competency in common between interactions performed at different times, there could also be (in either or both of the interactions) additional incidental findings, such as abnormal breath sounds (e.g., exercise induced asthma) to fit the case and/or to act as distractors.

After the assessment [904] of the user's level in the competencies implicated by the second interaction with the simulator, the method of FIG. 9 continues with processing [905] the differences between the competency data gathered for the user at times T=1 and T=2, then applying [906] the results of that processing. Preferably, a method such as shown in FIG. 9 will be performed in such a manner (e.g., using a computer configured to generate a large number of apparently different simulation scenarios which test a common core of shared competencies) that there will be significant overlap between the competencies implicated by the interactions which take place at times T=1 and T=2. If this is the case, the processing [905] and application [906] of the results of those interactions will preferably be performed for each of the competencies implicated by both interactions, meaning that a method such as shown in FIG. 9 will preferably be able to apply [906] the results differently on a competency by competency basis.

To illustrate how this competency by competency processing and application could take place, consider a scenario in which the user's level of ability to identify a systolic murmur with a stethoscope (i.e., competency A) may have remained constant or even increased from Simulator Case One to Simulator Case Two, while the user's level of ability to locate and assess pedal pulses (i.e., competency B) and to locate and assess the PMI (i.e., competency C) may have diminished to, respectively, 50% and 25% of their values as determined at time T=1 by the time of the interaction at time T=2.

In such a scenario, the processing [905] of the differences between competency data could indicate that the user's level had little or no degradation in competency A, the greatest degradation in competency C, and an intermediate level of degradation in competency B. These findings could then be applied [906] by scheduling one or more educational interventions for the user, focusing primarily on competency C, addressing (but not focusing as heavily on) competency B, and spending only minimal time on competency A. The results of processing [905] competency differences in a method such as shown in FIG. 9 could also be applied [906] by manipulating data associated with a user, such as a user model which could be used to project the user's level in various competencies at various points in time. For example, if a user's expected level in a given competency is determined (e.g., by subtracting an expected level change from a base level) using a model of the form $E(\Delta L) \propto e^{-(t/s)}$ (where $E(\Delta L)$ is the expected value of the change in the user's level for the competency, t is the length of time over which the expected change in the user's level would take place, and s is a retention factor for the user which is specific to the competency), then application [906] of the results could include modifying (e.g., using curve fitting algorithms) user specific variables from the model (e.g., s, which is shown in the model, or coefficients which could be applied to the listed parameters, which are not) so that projections made using the model will more accurately reflect the collected data. Other approaches to processing [905] and applying [906] competency differences (e.g., requiring a repetition of one or more interactions if a degradation is severe enough or different enough from what would have been expected using a model based on the user's prior performance that it appears more likely to have resulted from a measurement error than to accurately reflect a change in the user's level for the relevant competency) are also possible, and will be immediately apparent to those of ordinary skill in the art in light of this disclosure. Accordingly, the discussion of the processing [905] and application [906] steps set forth above, like the remaining discussion of the process of FIG. 9, should be understood as being illustrative only, and should not be treated as limiting.

Figure 10:
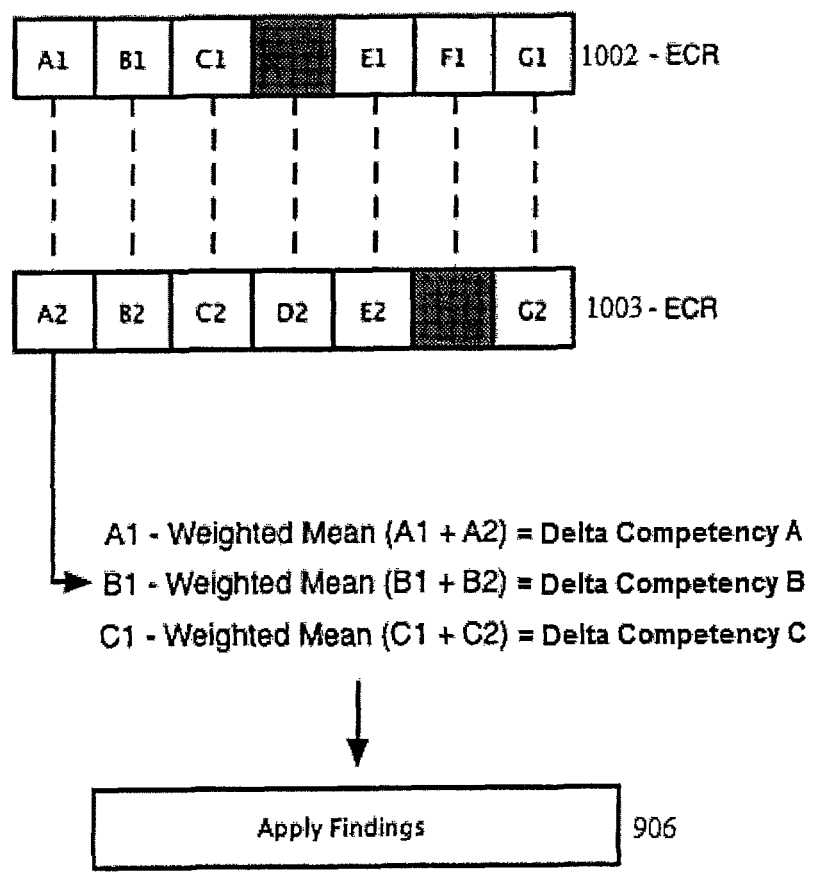
FIG. 10 depicts a potential format which could be used to represent competency data, and a potential approach which could be used to process that competency data.

Turning now to FIG. 10, that figure depicts a potential format which could be used to represent competency data, and a potential approach which could be used to process that competency data in a method such as shown in FIG. 9. Specifically, FIG. 10 illustrates an exemplary format [1001] for a competency vector in which data for a specific competency is represented as a combination of an ability (e.g., ability to detect a murmur), a score (e.g., a z-score or score expressed on a scale of 0-100), and a weight (e.g., 0.3 on a scale of 0.1-1.0). In embodiments representing competency data using a vector such as shown in FIG. 10, the ability will preferably identify the competency the vector relates to, the score will preferably reflect the user's performance, and the weight will preferably reflect the relative significance of the assessment used to generate the score. For example, a 10-question multiple choice quiz might be given a weight of 0.1, while the exam following a two-day intensive seminar might be given a weight of 1.0.

As shown in FIG. 10, competency vectors [1001] such as discussed above can be organized into arrays [1002][1003] which could be stored in electronic competency records ("ECRs"). These arrays can include both vectors storing competency data for a user at a certain time (e.g., a first array [1002] could include competency data showing the user's level at time T=1 and a second array [1003] could include competency data showing the user's level at time T=2), as well as null vectors (e.g., vectors storing a placeholder for the ability represented by the vector and a zero for the vector's weight) for competencies which were not implicated by an interaction at the time associated with an array. For example, FIG. 10 depicts a first array [1002] which includes vectors for competencies A1, B1, C1, E1, F1, and G1, indicating that each of competencies A, B, C, E, F, and G were implicated by an interaction at time T=1, but that competency D was not indicated at that time. Similarly, the second array [1003] depicted in FIG. 10 includes vectors only for competencies A2, B2, C2, D3, E2, and G2, indicating that the user's interaction at time T=2 implicated competencies A, B, C, D, E and G, but not competency F. As shown in FIG. 10 fact that there is not a one to one correspondence between the competencies implicated by the interactions at times T=1 and T=2 need not prevent the competency data such as shown in the arrays [1002][1003] from being processed.

With respect to the specific processing illustrated in FIG. 10, in that figure, weighted means of the score components of the competency vectors in the depicted arrays are used to estimate the user's current level in the relevant competencies (e.g., the weighted mean of the scores for competency A at times T=1 and T=2 is used as an estimate of the user's actual level for competency A at the time the processing takes place, which may be the same as or after time T=2). These estimated current levels are then subtracted from the levels represented by the scores from the array [1002] prior to the most recent array [1003] being processed to obtain a change in the user's score between the time associated with that array (i.e., time T=1) and the time the processing takes place. For example, if we have two vectors for competency A, the first having a score value of 90 on a scale of 1-100 and a weight value of 0.30 on a scale of 1-1.0, and the second having a score value of 80 on a scale of 0-100 and a weight value of 0.20 on a scale of 0-1.0, then the user's current level for competency A can be estimated at $((0.6 \times 90)+(0.4 \times 80))/(0.4+0.6)=86$, where $0.6=0.3/(0.2+0.3)$ and $0.4=0.2/(0.2+0.3)$. This current level can then be subtracted from the score from the earlier of the two arrays to obtain an estimated change in the user's level of 90−86=4. This estimated change in the user's level and/or the user's estimated current level, can be fed to a process in which they are applied for the user, such as described above in the context of FIG. 9.

Figure 11:
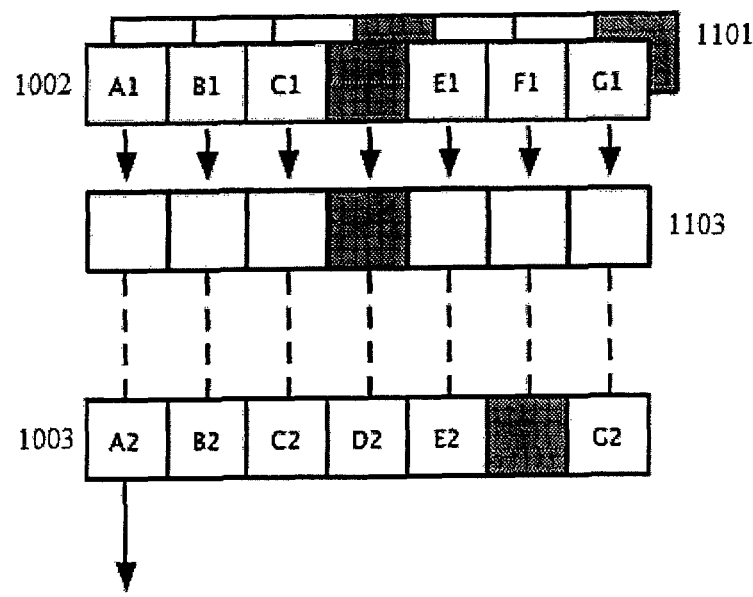
FIG. 11 depicts an approach to applying processing an arbitrary number of arrays of competency vectors.

Turning now to FIG. 11, that figure depicts an approach to applying processing such as shown in FIG. 10 to an arbitrary number of arrays of competency vectors. Specifically, FIG. 11 illustrates a scenario in which an array [1002] of competency data for an interaction at time T=1 is blended with at least one array [1101] of competency data for an interaction which took place prior to time T=1. This blending can be performed, for example, by creating blended competency vectors having the form [1102] shown in FIG. 11, in which the score can be set equal to the weighted average of the scores for that competency in the arrays being blended, and the weight can be set equal to the sum of the weights from the vectors for that competency in the arrays being blended. These blended competency vectors can be collected in a blended array [1103] which can be processed with the array [1003] of competency data for the interaction at time T=2 in the same manner as discussed previously, but with the blended array [1103] taking the place of the array [1002] of competency data for the interaction at time T=1. That is, for each competency for which data is available, the user's level in that competency at the time the processing takes place can be estimated by taking the weighted mean of the scores for that competency in the blended array [1103] and the most recent array [1003], and the change in the user's level between the time of the most recent vector represented in the blended array (which, in this example, would be time T=1) could be determined by subtracting that weighted mean from the that competency from the score for that competency in the blended array [1103]. These results can then be provided to a process which would apply them for the user, as discussed previously in the context of FIGS. 9 and 10.

Figure 12:
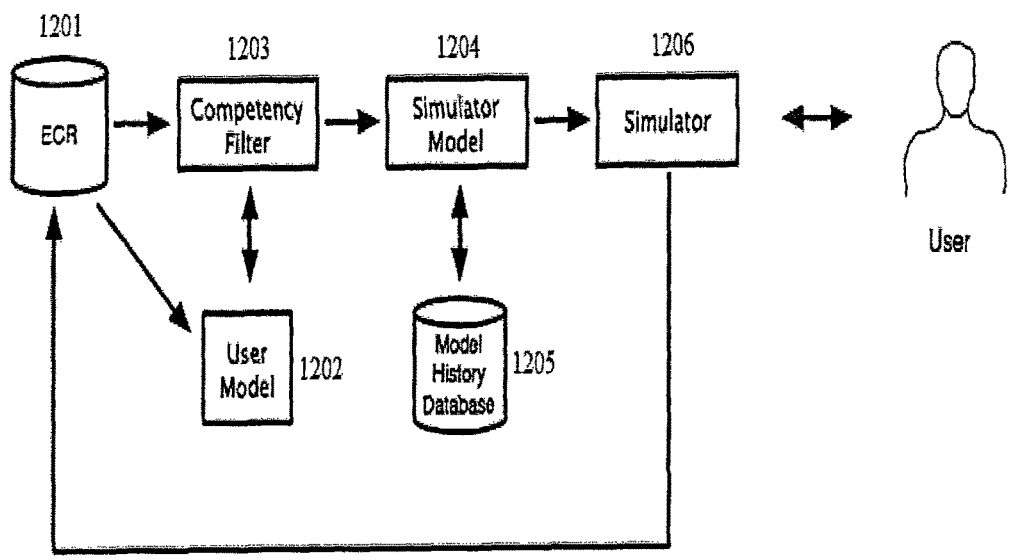
FIG. 12 depicts a potential high level architecture for a system which could be used to customize a planned simulation activity.

Turning now to FIG. 12, that figure illustrates a potential high level architecture for a system which could be used to customize a planned simulation activity (e.g., an interaction with a simulator such as illustrated as taking place at times T=1 and T=2 in the method of FIG. 9) for a user. As shown in FIG. 12, such a system could include an ECR database [1201] storing one or more electronic competency records for a user, which electronic competency records will preferably comprise arrays of competency vectors such as described in the context of FIGS. 10 and 11. In order to customize the planned simulation activity, a system following the architecture of FIG. 12 could retrieve the user's data from those competency records, and provide it as parameters for rules in a user model [1202] which would be evaluated to determine the user's need for instruction in a particular competency by a computer configured to act as a rules engine (and which might also be configured to perform any incidental processing which might be necessary for that evaluation, such as generating estimated current competency levels if such levels were required by the rules and were not already available in the data from the ECR database [1201]). As an example of the types of rules such a user model [1202] could contain, it is possible that a system following the architecture of FIG. 12 could be implemented with a user model comprising rules defined by a certification body in charge of continuing education requirements for a user. In this type of case, the evaluation of the rules using data on the user from the ECR database [1201] could be performed to identify when, and in what competencies, the user should be required to undergo instruction in order to maintain his or her certification.

To provide a concrete illustration, if data from the ECR database [1201] indicated that the user's level for the ability to correctly diagnose a patient with heart failure had fallen from 90 to 86 between his or her two most recent assessments, and the user model [1202] included a rule for that competency indicating that additional instruction should be required if a user's level dropped below 80 on the relevant scale, the evaluation of the rules with the user's data from the ECR database [1201] could indicate that no further study in that competency was necessary, as the user's level had remained above the remediation threshold despite the observed deterioration. Alternatively, if the user's level for that same competency had dropped by 40 points, from 90 to 50, then, in this illustration, the evaluation of the rules with the user's data would indicate that the user's level for the ability of correctly diagnosing a patient with heart failure was insufficient and/or that he or she required additional instruction in that competency.

Of course, it should be understood that, while evaluation of rules from a user model [1202] using data regarding the user from an ECR database [1201] could provide an indication of the user's level/need for additional instruction in each competency for which data is available, it is possible that a system such as shown in FIG. 12 could be used to customize a simulation which, even with maximum customization, would not implicate all competencies where the user might need additional instruction. For example, if a system such as shown in FIG. 12 was used to customize a planned simulation activity designed to instruct the user in performance of a specific cardiac exam procedure, then that simulation probably would not be (and would not be expected to be) appropriate for assessing or providing instruction to the user in the competency of setting broken bones. In such a case, a system as shown in FIG. 12 could use a competency filter [1203] to filter data from the ECR database [1201] before that data was used in evaluating the rules from the user model [1202], or to filter the results of the evaluation of the rules from the user model [1202] so that only data on competencies which could potentially be implicated by the planned simulation activity would considered when customizing the simulation for the user.

Once the data regarding the user's competencies which would be used for customizing the simulation had been obtained (e.g., by evaluation of rules from a user model [1202] and/or application of a competency filter [1203] to the results of that evaluation) that data would be used to determine a simulator model [1204] which would control the user's experience in the simulation. For example, if the evaluation of the rules in the user model [1202] indicates that the user is severely lacking in the ability to identify a systolic murmur with a stethoscope (i.e., competency A from the example discussed in the context of FIG. 9), a system following the architecture of FIG. 12 could be configured to ensure that the simulation was based on a simulator model [1204] which would provide ample opportunities for practice and instruction on that competency. A system following the architecture of FIG. 12 could also be configured to use data regarding a user's pervious interactions from a model history database [1205] to minimize or eliminate repetition of individual simulated patient cases. Thus, if a planned simulation activity involves the user interacting with a simulator [1206] (e.g., a mannequin which could be examined in the same manner as a live patient) which would generate appropriate findings (e.g., heart sounds) for a simulated case, then the simulation activity could be customized for the user by identifying (e.g., by analysis of metadata), from one or more stored simulated cases with which the planned simulation activity could be performed, those cases which were most suitable for instructing the user in the competencies where he or she required instruction and which the user had not (or not recently) previously been exposed to, then providing one of those cases to the simulator [1206]. After the simulation activity is complete, the results of that activity could then be fed back the ECR database [1201] (e.g., in the form of an array of competency vectors) for use in customizing future simulations.

As a simple illustration of how a user interaction with a simulator as described in the context of FIG. 12 could take place, consider the case of an assessment method which applies a binary pass/fail assessment of a mix of competencies associated with a simulated patient case. In this type of pass/fail implementation, if a user misdiagnoses the simulated patient case, then all of the competencies associated with the case are given a fail score. Subsequent patient cases can then be generated by the simulator to address each of the failed competencies, with equal weight. Of course, it should be understood that the disclosed technology is not limited to being implemented in this relatively simple manner, and that implementations which are designed with objectives other than minimization of required computational resources are likely to be more sophisticated than the binary/pass fail assessment method described above. For example, systems following the architecture of FIG. 12 could be implemented to support functionality such as providing feedback with different weights for different competencies based on the simulated case presented to the user and/or individually measuring user competencies (and doing so on a numeric scale, or other scale capable of reflecting more fine tuned distinctions than simply pass/fail status) based on what symptoms a user was able to detect or the conclusions drawn from those symptoms.

Variations are also possible in aspects and features other than the complexity of particular implementations of the teachings of FIG. 12 (or other aspects of this disclosure). For example, a system following an architecture such as shown in FIG. 12 could be configured to determine a user's need for instruction in various competencies, not based on the user's current need, but based on whether the user could be expected to have such a need at some point in the future. To illustrate, consider a case where a certification body has a requirement that all certified individuals maintain a skill level of at least 80 points on a 100 point scale for a particular competency. In such a case, if a system following the architecture of FIG. 12 is being used to customize a planned simulation activity, and the user for whom the simulation activity is being customized is not scheduled for further instruction at any time in the six month period following the planned simulation activity, a rule could be implemented that the user should be treated as needing instruction in the particular competency if his or her skill level in that competency could be expected to fall below 80 points on the 100 point scale at any time in the six month period following the planned simulation activity, regardless of his or her skill level at the time the planned simulation activity would take place.

As an example of another type of variation on how the teachings of this disclosure could be implemented, consider variations on a user model such as shown in the architecture of FIG. 12. The discussion of FIG. 12 explained that a user model [1202] could comprising rules for determining the competency or competencies in which a user required instruction. However, it is also possible that a user model [1202] could comprise models used in generating estimated skill levels for the user (e.g., a model of the form $E(\Delta L) \propto e^{-(t/s)}$, discussed in the context of FIG. 9), with the rules for determining whether the results of those models should be treated as indicating that the user needs additional instruction being kept entirely separate (e.g., in a certification rules database). This type of user model (i.e., one comprising models used in generating estimated skill levels) could be implemented in a variety of different ways, such as in user models comprising different models for different competencies (e.g., each competency would correspond to a model of the form $E(\Delta L) \propto e^{-(t/s)}$, where the value of s would vary from competency to competency), or in user models with different types of models for selectively generating skill estimates based on the period for which the estimate is generated (e.g., a user model could include a model of the form $E(\Delta L) \propto e^{-(t/s)}$ for generating estimates for values of t great enough that the estimate would be reflective of the user's long term memory, and could also include a model of the form $c = p_1 t^n + p_2 t^{n-1} + p_3 t^{n-2} + \ldots + p_{n-1} t + p_n$ for values of t small enough to be contained within a single training session). In this way, it is possible that a single user model could potentially be used for both projecting long term skill decays for the purpose of scheduling instruction, as well as short term learning for the purpose of controlling an intelligent tutoring system.

Further variations are also possible, and will be immediately apparent to one of ordinary skill in the art in light of this disclosure. For example, while the discussion of FIGS. 9-12 focused primarily on applications where the disclosed technology was used to customize, or performed calculations based on, interactions between a user and a simulator, the techniques illustrated in FIGS. 9-12 and disclosed in the associated text are not limited to being used in the context of simulations, and could be equally applied to non-simulator based techniques of instruction and assessment. Similarly, while the discussion of FIG. 12 focused on customizing a particular simulation for a user, it is possible that a system implemented according to the architecture shown in that figure could use the results of a single application of user data to rules in customizing multiple simulated activities for a user (e.g., if the application of rules such as described in the context of FIG. 12 indicates that a user requires instruction in competencies other than those implicated by a planned simulation activity, this information can be saved and used to schedule and/or customize future activities which do implicate those competencies). Accordingly, the protection provided by this document should not be limited to the material explicitly disclosed. Instead, such protection should be understood to be defined by the claims, when the terms in those claims which are explicitly defined under the "Explicit Definition" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definition" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "based on" should be understood to mean that something is determined at least in part by the thing that it is indicated as being "based on." When something is completely determined by a thing, it will be described as being "based EXCLUSIVELY on" the thing.

When used in the claims, a "computer" should be understood to refer to a device or group of devices which is capable of performing one or more logical and/or physical operations on data to produce a result.

When used in the claims, "computer executable instructions" should be understood to refer to data, whether stored as hardware, software, firmware, or some other manner, which can be used to specify physical or logical operations to be performed by a computer.

When used in the claims, "data" should be understood to refer to information which is represented in a form which is capable of being processed, stored and/or transmitted.

When used in the claims, "data structure" should be understood to refer to an organization used for storing data so that the data can be accessed and processed in appropriate ways. The term "data structure" can also refer to concrete embodiments of the same (e.g., both a class and an instance of the class).

When used in the claims, a "database" should be understood to refer to an organized collection of data.

When used in the claims, "local memory" should be understood to refer to a device for storing data which is in a location physically proximate (i.e., accessible without communicating through a network) to the device or devices which retrieve that data. Examples of local memory include random access memory (RAM), flash drives, hard disks, and CD-ROMS.

When used in the claims, "means for generating an estimated user level" should be understood as a limitation set forth as a means for performing a specified function as permitted by 35 U.S.C. §112(f), with the specified function being generating an estimated user level, and the corresponding structure including a computer configured to (1) perform an algorithm comprising inserting user and/or time specific values for the parameters of into one or more of the models discussed in the context of variations on the user model of FIG. 12 and calculating the estimated value using those models, and/or (2) perform an algorithm comprising inserting user specific values into the parameters for weighted average calculations described in the contexts of FIGS. 10 and 11 and calculating the estimated values by calculating the weighted averages with the user specific values.

When used in the claims, "metadata" refers to data which functions as a description or definition for some other data.

When used in the claims, "metadata scheme" refers to an organization or structure for information in a database which is expressed through metadata (though that metadata can also include other information besides the scheme).

When used in the claims, "module" refers to a set of data, including computer executable instructions, which is used to configure a computer to perform a specific task or function.

When used in the claims, "reflecting," in the context of information "reflected" in data, should be understood to indicate that the information "reflected" can be retrieved from the data, even though the information may not be explicitly specified by the data (for example, actual numeric data values, as well as information about those values determined by the order in which they are stored in a medium would be considered to be "reflected" in the data).

When used in the claims, "set of computer executable instructions" should be understood to refer to an identifiable group of computer executable instructions. Examples to illustrate the meaning of a "set of computer executable instructions" include a program, and modules within a program.

When used in the claims, "set of data" should be understood to refer to an identified grouping, category or class or data. Examples to illustrate the meaning of a "set of data" include files, and instantiated classes.

What is claimed is:

1. A non-transitory computer readable medium having stored thereon a set of computer executable instructions operable to configure a computer to perform a set of acts comprising:
   a) receiving a set of user data from a database, said user data comprising a plurality of values corresponding to a plurality of competencies;
   b) storing said set of received user data in a local memory of said computer;
   c) applying the set of received user data stored in said local memory to a predictive model;
   d) determining a set of content for presentation to a user, wherein:
      i) the set of content is determined based on matching material for presentation to the user with a predicted skill level for the user at a time of presentation as indicated by the predictive model; and
      ii) the set of content is tagged as implicating a first competency from the plurality of competencies;
   e) incorporating, into the database from which the set of user data was received, a set of evaluation data received from said user in response to an evaluation comprising at least one question tagged as implicating the first competency from the plurality of competencies;
   wherein:
   A) determining the set of content for presentation to the user based on matching material for presentation to the user with the predicted skill level for the user comprises:
      I) determining, using the predictive model, an estimated skill level for the user in the first competency at the time of presentation;
      II) determining, based on the estimated skill level for the user in the first competency at the time of presentation, whether the user should be treated as requiring instruction in the first competency; and
      III) determining that the set of content is suitable for providing instruction in the first competency based on the set of content being tagged as implicating the first competency;
   B) the set of content is tagged as implicating both the first competency from the plurality of competencies and a second competency from the plurality of competencies;
   C) determining the set of content for presentation to the user based on matching material for presentation to the user with the predicted skill level for the user comprises:
      I) determining an estimated skill level for the user in the second competency at the time of presentation;
      II) determining, based on the estimated skill level for the user in the second competency at the time of presentation, whether the user should be treated as requiring instruction in the second competency; and
      III) determining that the set of content is suitable for providing instruction both in the first competency based on the set of content being tagged as implicating the first competency, and in the second competency based on the set of content being tagged as implicating the second competency;
   D) the predictive model is specialized for predicting skill levels for the user in the first competency;
   E) the estimated skill level for the user in the second competency is determined using a second predictive model specialized for predicting skill levels for the user in the second competency
   F) the predictive model is specialized for predicting skill levels for the user in the first competency through the use of a parameter which mediates the influence of time on an expected change in the user's skill level which is specific to the first competency;
   G) the second predictive model is specialized for predicting skill levels for the user in the second competency through the use of a parameter which mediates the influence of time on an expected change in the user's skill level which is specific to the second competency and which is different from the parameter used to specialize the first predictive model;
   H) the set of content for presentation to the user comprises a simulated patient case; and
   I) the set of acts the instructions are operable to configure the computer to perform comprises providing the simulated patient case to a mannequin-based simulator.

2. The non-transitory computer readable medium of claim 1, wherein the predictive model is a model of the form:

$$E(\Delta L) \propto e^{-(t/s)}$$

wherein:
a) $E(\Delta L)$ is an expected change in the user's skill level;
b) t is a duration between a time associated with a skill level from the set of user data received from the database and the time of presentation for which the predicted skill level is indicated; and
c) s is a retention factor specific to the user and to the first competency.

3. The non-transitory computer readable medium of claim 2, wherein the duration between the time associated with the skill level from the set of user data received from the database and the time of presentation for which the predicted skill level is indicated is more than one day.

4. A method comprising:
a) receiving a set of user data from a database, said user data comprising a plurality of values corresponding to a plurality of competencies;
b) storing said set of received user data in a local memory of a computer;
c) applying the set of received user data stored in said local memory to a predictive model;
d) determining a set of content for presentation to a user, wherein:
   i) the set of content is determined based on matching material for presentation to the user with a predicted skill level for the user at a time of presentation as indicated by the predictive model;
   ii) the set of content is tagged as implicating a first competency from the plurality of competencies; and
   iii) determining the set of content for presentation to the user is performed by a processor executing instructions stored on a computer readable medium;
e) incorporating, into the database from which the set of user data was received, a set of evaluation data received from said user in response to an evaluation comprising at least one question tagged as implicating the first competency from the plurality of competencies;
wherein:
A) the set of content for presentation to the user comprises a simulated patient case;
B) the method comprises providing the simulated patient case to a simulator;
C) the evaluation comprising at least one question tagged as implicating the first competency comprises a request for a diagnosis based on interaction between the user and the simulator;
D) the method comprises presenting the set of content to the user by configuring the simulator to generate findings appropriate to the simulated patient case; and
E) the simulator is a mannequin-based simulator.

5. The method of claim 4, comprising determining a continuing education requirement for the user, wherein the continuing education requirement is specific to the user and requires differing levels of training for different competencies based on data stored in the database from which the set of user data was received.

6. The method of claim 4, wherein determining the set of content based on matching material for presentation to the user with the predicted skill level for the user at the time of presentation as indicated by the predictive model comprises determining an estimated skill level for the user in the first competency by calculating a weighted average of a plurality of scores for the user in the first competency taken from the set of user data received from database, wherein the scores from the plurality of scores are weighted based on relative significance for assessments used to generate those scores.

7. The method of claim 6, wherein:
a) the plurality of scores for the user in the first competency taken from the set of user data received from the database comprises:
   i) a first score associated with a first time; and
   ii) a second score associated with a second time;
b) the first time and the second time are separated by a duration of more than one day.

8. The method of claim 6, wherein:
a) the set of user data received from the database comprises a plurality of arrays, each array from the plurality of arrays comprising a vector for each competency from the plurality of competencies and associated with a time, wherein the plurality of arrays comprises:
   i) a first array associated with the first time; and
   ii) a second array associated with the second time;
b) the first score is comprised within a competency vector from the first array comprising:
   i) the first score;
   ii) an identification of the first competency; and
   iii) a weight for the first score;
c) the second score is comprised within a competency vector from the second array comprising:
   i) the second score;
   ii) an identification of the first competency; and
   iii) a weight for the second score.

9. A machine comprising:
a) a database;
b) a computer; and
c) a simulator;
wherein:
A) the computer is configured by data stored on a non-transitory computer readable medium to perform a set of acts comprising:
   I) receiving a set of user data from the database, said user data comprising a plurality of values corresponding to a plurality of competencies;
   II) storing said set of received user data in a local memory;
   III) applying the set of received user data stored in said local memory to a predictive model;
   IV) determining a set of content for presentation to a user, wherein:
      a) the set of content is determined based on matching material for presentation to the user with a predicted skill level for the user at a time of presentation as indicated by the predictive model; and
      b) the set of content is tagged as implicating a first competency from the plurality of competencies;
   V) incorporating, into the database, a set of evaluation data received from said user in response to an evaluation comprising at least one question tagged as implicating the first competency from the plurality of competencies;
B) determining the set of content for presentation to the user based on matching material for presentation to the user with the predicted skill level for the user comprises:
   I) determining, using the predictive model, an estimated skill level for the user in the first competency at the time of presentation;
   II) determining, based on the estimated skill level for the user in the first competency at the time of presentation, whether the user should be treated as requiring instruction in the first competency;
   III) determining that the set of content is suitable for providing instruction in the first competency based on the set of content being tagged as implicating the first competency;
C) the set of content is tagged as implicating both the first competency from the plurality of competencies and a second competency from the plurality of competencies; and
D) determining the set of content for presentation to the user based on matching material for presentation to the user with the predicted skill level for the user comprises:

I) determining an estimated skill level for the user in the second competency at the time of presentation;
  II) determining, based on the estimated skill level for the user in the second competency at the time of presentation, whether the user should be treated as requiring instruction in the second competency;
  III) determining that the set of content is suitable for providing instruction both in the first competency based on the set of content being tagged as implicating the first competency, and in the second competency based on the set of content being tagged as implicating the second competency;
E) the predictive model is specialized for predicting skill levels for the user in the first competency;
F) the estimated skill level for the user in the second competency is determined using a second predictive model specialized for predicting skill levels for the user in the second competency;
G) the evaluation comprising at least one question tagged as implicating the first competency from the plurality of competencies also comprises at least one question tagged as implicating the second competency from the plurality of competencies;
H) incorporating the set of evaluation data received from the user comprises modifying the predictive model and the second predictive model by using one or more curve fitting algorithms to account for responses provided by the user to the questions tagged as implicating the first and second competencies;
I) the set of content for presentation to the user comprises a simulated patient case;
J) the set of acts the computer is configured to perform comprises providing the simulated patient case to the simulator; and
K) the simulator is a mannequin-based simulator.

10. The machine of claim 9, wherein:
a) the machine comprises a means for generating an estimated user level; and
b) the set of acts the computer is configured to perform comprises treating an estimated user level generated by the means for generating the estimated user level as the predicted skill level for the user.

11. The machine of claim 10, wherein the computer is the means for generating the estimated user level.

* * * * *